United States Patent
Al Salem et al.

(10) Patent No.: US 12,219,959 B1
(45) Date of Patent: Feb. 11, 2025

(54) POLYMERIC ANTI-MICROBIAL FILM

(71) Applicant: KUWAIT INSTITUTE FOR SCIENTIFIC RESEARCH, Safat (KW)

(72) Inventors: Sultan Al Salem, Safat (KW); Fadhilah Al Salameen, Safat (KW); M. Sherif El-Eskandarany, Cairo (EG)

(73) Assignee: KUWAIT INSTITUTE FOR SCIENTIFIC RESEARCH, Safat (KW)

( * ) Notice: Subject to any disclaimer, the term of this patent is extended or adjusted under 35 U.S.C. 154(b) by 0 days.

(21) Appl. No.: 18/909,414

(22) Filed: Oct. 8, 2024

(51) Int. Cl.
*A01N 59/20* (2006.01)
*A01N 25/10* (2006.01)
*A01P 1/00* (2006.01)

(52) U.S. Cl.
CPC .............. *A01N 59/20* (2013.01); *A01N 25/10* (2013.01); *A01P 1/00* (2021.08)

(58) Field of Classification Search
CPC ............ A01N 59/20; A01N 25/10; A01P 1/00
See application file for complete search history.

(56) References Cited

U.S. PATENT DOCUMENTS 9,609,874 B1 * 4/2017 El-Eskandarany ....... C22C 9/06
11,102,983 B2 8/2021 Mcdaniel

FOREIGN PATENT DOCUMENTS

WO 2022150935 A1 7/2022

OTHER PUBLICATIONS

Ma, C. et al., "Future Antiviral Polymers by Plasma Processing", Progress in Polymer Science 118:101410 (2021).
Vijayan, P. et al., "Nanocoatings: Universal antiviral surface solution against COVID-19", Progress in Organic Coatings 163:106670 (2022).
Imani, S. M. et al., "Antimicrobial Nanomaterials and Coatings: Current Mechanisms and Future perspectives to Control the Spread of Viruses Including SARS-COV-2", ACS Nano 14: pp. 12341-12369 (2020).
Mouritz, A.P. et al., "Towards antiviral polymer composites to combat COVID-19 transmission", Nano Select 2: pp. 2061-2071 (2021).
Srisa, A. et al., "Antibacterial, Antifungal and Antiviral Polymeric Food Packaging in Post-COVID-19 Era", Polymers 14:4042 (2022).
Erkoc, P. & Ulucan-Karnak, F., "Nanotechnology-Based Antimicrobial and Antiviral Surface Coating Strategies", Prosthesis 3: pp. 25-52 (2021).

* cited by examiner

*Primary Examiner* — Mina Haghighatian
*Assistant Examiner* — Nathan W Schlientz
(74) *Attorney, Agent, or Firm* — Nath, Goldberg & Meyer; Joshua B. Goldberg

(57) ABSTRACT

A nano-coated polymeric antimicrobial film including a polymer and a metallic glassy powder coating on the polymer. The polymer includes a polymeric material selected from a virgin linear low-density polyethylene (LLDPE), a plastic solid waste (PSW), and a bio-based plastic. The metallic glassy powder is selected from the group consisting of $Cu_{53.3}Zr_{25.5}Nb_{12.9}Ni_{8.3}$, $CuZn_{54}Zr_{25}Nb_{14}Ni_7$, $Cu_{48}Ti_{17}Ni_{28}Zr_5Ag_2$, and $Cu_{85}/SUS316L_{10}/Ag_5$. The resulting nano-coated polymeric antimicrobial film has anti-microbial protective effects and may be applied to surfaces where antimicrobial activity is desired.

18 Claims, No Drawings

POLYMERIC ANTI-MICROBIAL FILM

BACKGROUND

1. Field

The present disclosure relates to anti-microbial products and, particularly, to a polymeric anti-microbial film.

2. Description of the Related Art

Solid waste (SW) accumulation and, particularly, plastic solid waste (PSW), requires mitigation. Plastics are used ubiquitously due to their flexibility, versatility, and hygienic properties, and are particularly prevalent in aerospace, food, medical industries, and engineering commodity applications. Increasing use of such products will inevitability increase PSW accumulation without proper management or disposal of waste components or waste management infrastructures.

Thermoplastic substrates have been developed that are suitable to form an anti-microbial surface. The COVID-19 pandemic, and the possibility of future pandemics, motivates development of improved anti-microbial surfaces and coatings.

Recent research has shown that the Corona viruses (and its most common strains) can remain viable or infectious on surfaces made of metal, glass, wood, fabrics, and plastic for several hours to days, despite the fact that the surface may visually appear either dirty or clean (Liao et al., 2021, Emani et al., 2021). However, the thin envelope that encases the microbe may be easily ruptured by common disinfectants such as ethanol (62-71%), hydrogen peroxide (0.5%), or sodium hypochlorite (0.1%). This makes it possible for the Corona viruses to be eradicated with relative ease using somewhat conventional antimicrobial agents as stated prior.

It is nearly difficult to sterilize a surface each and every time, and cleaning a surface does not ensure that it will not get contaminated once more in the near future. It is a more efficient approach if a means is to be developed to have surfaces reject the actual pathogens (on their own, all the time), so as not to allow it to stick to it (on the surface) or self-sanitize (on its own) by neutralizing the pathogens (Imani et al., 2020, Balasubramaniam et al., 2021, Koduru et al., 2018, Mallakpour et al., 2020a, Mallakpour et al., 2020b, Mallakpour et al., 2020c; Mallakpour et al., 2021a, Mallakpour et al., 2021b). The latter approach would also prevent pathogens to stick to the surface as desired nowadays by the market (Pang et al., 2019, Duval et al., 2021, Wang et al., 2020), especially given that viruses namely COVID-19 stick to surfaces for several days at a time as reported in the cited references.

Copper (Cu) and its nanocomposites can be safely used to coat all types of solid materials without exceptions. The US Environmental Protection Agency (EPA) registered 355 Cu alloys with public health claim (El-Eskanadrany and Al-Azmi, 2017). The products made from any of these registered alloys are legally permitted to make public health claims relating to the control of organisms that pose a threat to human health. El-Eskandarany and Al-Azmi (2017) have previously applied glassy Cu50Ti20Ni30 alloy nano-powders on stainless steel to produce hygienic surfaces for medical instruments as antimicrobial surfaces.

Thus, an anti-microbial film solving the aforementioned problems is desired.

SUMMARY

In an embodiment, the present subject matter relates to a nano-coated polymeric antimicrobial film including a polymer and a metallic glassy powder coating. In an embodiment, the polymer can include a polymeric material selected from the group consisting of a virgin linear low-density polyethylene (LLDPE), plastic solid waste (PSW), a bio-based plastic (e.g., biodegradable polymeric matrix), and a combination thereof. In an embodiment, the polymeric material can include a blend of LLDPE and PSW. In an embodiment, the metallic glassy powder coating can be cold-sprayed onto the polymer. In one embodiment, the metallic glassy powder can be selected from the group consisting of $Cu_{53.3}Zr_{25.5}Nb_{12.9}Ni_{8.3}$, $CuZn_{54}Zr_{25}Nb_{14}Ni_7$, $Cu_{48}Ti_{17}Ni_{28}Zr_5Ag_2$, $Cu_{85}/SUS316L_{10}/Ag_5$, and a combination thereof. The nano-coated polymeric antimicrobial film has antimicrobial protective effects and may be applied to surfaces where antimicrobial activity is desired.

In another embodiment, the present subject matter relates to a method of protecting a surface from microbial growth that can include contacting the surface with an antimicrobial film as described herein. The antimicrobial film can include a polymeric film including at least one polymeric material selected from the group consisting of a linear low-density polyethylene (LLDPE), a plastic solid waste (PSW), a bio-based plastic, and a combination thereof, and a metallic coating on the polymeric material. The metallic coating can include a metallic alloy powder selected from the group consisting of $Cu_{53.3}Zr_{25.5}Nb_{12.9}Ni_{8.3}$, $CuZn_{54}Zr_{25}Nb_{14}Ni_7$, $Cu_{48}Ti_{17}Ni_{28}Zr_5Ag_2$, $Cu_{85}/SUS316L_{10}/Ag_5$, and a combination thereof.

These and other features of the present subject matter will become readily apparent upon further review of the following specifications. Applications of such are numerous and can be (but are not limited to) used for medical facilities (and out of operating theater applications), self protecting personal equipment (PPE), personal devices and electronics, and the like.

DETAILED DESCRIPTION OF THE PREFERRED EMBODIMENTS

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter employs different types of agents that are environmentally friendly without causing degradation to material substrates. Such agents can possess a high degree of biocompatibility and a great effect as a viral protective coating. They can be used efficiently for frequently touched surfaces made from different materials. Employing plastic solid waste (PSW) surfaces can also present the advantage of having compatibility with copper (Cu) and its alloys; and their nanocomposite/nanopowder coats to be used as permanent surface protective coating for the recycled substrates against COVID-19. It also presents environmental sustainability aspects, as in the case of best utilizing waste as a sustainable feedstock and reducing burdens on infrastructure and urban environment. The use of nano-coats can easily be applied on such surfaces, which also presents a new venture for this idea of using PSW to develop antiviral surfaces.

In an embodiment, the present subject matter relates to a polymeric anti-microbial film including a polymeric film and a metallic coating disposed thereon. In an embodiment, the polymeric film can include at least one polymeric material selected from the group consisting of a linear low-density polyethylene (LLDPE), a plastic solid waste (PSW), a bio-based plastic, and a combination thereof. The metallic coating can include a metallic alloy powder selected from the group consisting of $Cu_{53.3}Zr_{25.5}Nb_{12.9}Ni_{8.3}$, $CuZn_{54}Zr_{25}Nb_{14}Ni_{7}$, $Cu_{48}Ti_{17}Ni_{28}Zr_{5}Ag_{2}$, $Cu_{85}/SUS3$-$16L_{10}/Ag_{5}$, and a combination thereof.

In another embodiment, the polymeric film can include polymeric materials coming from a variety of sources, including biodegradable polymers, plastic waste, virgin plastics, recycled materials, or blends of virgin/waste plastics.

In an embodiment, the polymeric material can include a blend of LLDPE and PSW, for example, a recycled substrate. In another embodiment, the polymeric material can include LLDPE, such as a virgin LLDPE. In an additional embodiment, the polymeric material can include PSW, including but not limited to biodegradable and recycled PSW.

In an embodiment, the bio-based plastic can include a biodegradable polymer. In an embodiment, the bio-based plastic can have a melting temperature ($T_m$) ranging from about 110° C. to about 150° C. In an embodiment, the bio-based plastic can have a $T_m$ of about 120° C. In an embodiment, the bio-based plastic can be selected from the group consisting of a modified polyester-polybutylene adipate terephthalate, polybutylene adipate co-terephthalate (PBAT), and polylactide. In various embodiments, the bio-based plastic can be a compostable polymer with biobased content, for example, thermoplastic starch, (TPS).

The polymeric antimicrobial film can have antimicrobial properties against various microorganisms. For example, the polymeric antimicrobial film can be applied to a surface to prevent or inhibit microbial growth. According to an embodiment, the microbial growth includes bacterial growth. According to an embodiment, a method of protecting a surface from bacterial growth can include contacting the surface with the antimicrobial film as described herein. In an embodiment, the bacterial growth comprises growth of Gram-negative bacteria. In one embodiment, the Gram-negative bacteria comprises *Escherichia coli* (*E. coli*). In an embodiment, the bacterial growth comprises growth of Gram-positive bacteria. In one embodiment, the Gram-positive bacteria comprises *Staphylococcus aureus* (*S. aureus*).

In certain embodiments, the surface to which the present antimicrobial films can be applied can be a plastic-based surface. Non-limiting examples of the surfaces to which the present antimicrobial films can be applied include packaging materials, plastic covers, household daily use items, hygienic surfaces for bank cards and soap dispensers, and medical appliances.

According to an embodiment, the polymeric antimicrobial film can be applied to a surface to prevent or inhibit viral growth. In an embodiment, a method of protecting a surface from viral growth can include contacting the surface with the antimicrobial film as described herein. In one embodiment, the viral growth can include growth of human coronavirus, e.g., human coronavirus strain OC43.

In an embodiment, the metallic alloy coating can be prepared from one or more metallic alloy powders selected from the group consisting of Cu, Zr, Ti, Nb, Ag, Ni, SUS316L$_{10}$, CuZn, and a combination thereof. In an embodiment, the metallic alloy coating can be prepared by mixing two or more metallic alloy powders using a ball milling process. In one embodiment, two or more of the Cu, Zr, Ti, Nb, Ag, Ni, SUS316, and CuZn powders are mixed, e.g., using a ball milling process. In an embodiment the powders can be mixed using an agate mortar and pestle inside a glove box filled with helium gas. The balls used to mix the solid powders in the glove box can be made from Cr-steel alloy and the powders can be disposed into a Cr-steel vial and sealed together with the balls in the glove box.

In another embodiment, the metallic alloy coating can include materials coming from a variety of sources, including of virgin origin, of waste origin, or a combination thereof.

In an embodiment, the metallic coating is a metallic glassy powder that can be sprayed onto the polymer. Preferably, the metallic glassy powder can be cold sprayed onto the polymer. It should be understood that the phrase "cold spray", as used herein, is also known in the art as "cold gas spray", "micro cold spray", "cold gas dynamic spray", "kinetic spray", and "supersonic particle deposition". In contrast to the typical thermal spray approach, the cold spray technique is a solid-state process in which the powder feedstock, such as the Cu nanopowder feedstock, does not melt and stays in its solid state throughout the operation.

To enhance successful coating processes and to produce homogeneous porosity-free plastic-coated systems by copper or copper alloys, cold spray coating technology can be used.

The present subject matter can be better understood by referring to the following examples.

EXAMPLES

Example 1

Preparation of Nanocoated Films

Polymer waste originating from municipal sources in the form of plastic films was acquired from local distributors within Kuwait. The material was previously characterized for polymer type and content (wt. %) which was determined as follows: LLDPE (46%), LDPE (51%), HDPE (1%) and PP (2%) (Al-Salem et al. 2015). Virgin LLDPE was acquired in the form of translucent 3 mm pellets (as EFDC-7050 grade-EQUATE Petrochemical Company) with a reported density (0.918 g cm$^{-3}$) and a melt flow index (MFI) of 2 g 10 min$^{-1}$. A BASF Co. Ecovio F23B1 compostable masterbatch (thermoplastic starch, TPS) certified as a compostable finished product was used as white translucent pellets. The additive was claimed to be certified by the manufacturer in accordance with EN 17033 as a biobased plastic (modified polyester-polybutylene adipate terephthalate, PBAT and polylactide) with a T$_m$ of 120° C. A Stand-Alone Brabender Single Screw Extruder (SSE) was used in the compounding process of the Ecovio F23B1 samples. The SSE was a floor standing model composed of single screw processing unit, drive, temperature, and speed control (barrel: Ø 19 mm, nitrided barrel bore) equipped with a pelletizing assembly and a film rolling take-off unit. The screw used was a progressive core with a compression ratio of 3:1 that is steel/hardened, chrome-plated and single flighted (L/D ratio of 25). A take-off sheet roll was also used, compatible with the die head, producing 100 μm thick sheets. The SSE was equipped with four zones and a fifth for the die head, and each batch processed was 1 kg. A rigid PVC cleaning agent (EXREIN VG/2, softening point <120° C., ρ equal to 1 g cc$^{-1}$) was purchased from BAERLOCHER Co. and used as turquoise pellets between each extrusion run.

The cleaning procedure was conducted using a set extrusion temperature for each zone as follows: 150° C., 160° C., 170° C., 170° C. and 170° C., respectively, with an extrusion speed ranging between 50 to 100 RPM. Dry blends were used to compound the LLDPE, PSW and the 50/50 samples (i.e., with no additives at the blending stage) for both virgin and waste polymers which were weighed, extruded and blown using a single screw extruder (Tecnova, L/D ¼ 30, 45 bar and 85 RPM) and a film blowing machine (Kung Hsing monolayer) with a water-cooling temperature maintained between 16° C. and 17° C. Die head temperature (DHT) of the extruder was maintained at 175° C., with the six zones maintained at 175-185° C. (Al-Salem 2019, Al-Salem et al., 2015, 2021a, 2021b).

Pure metallic alloying elements and alloy powders of Cu, Zr, Ti, Nb, Ag, Ni, SUS316, and CuZn powders (above 99.9 wt. %, less than 20 μm in diameter) were used as starting reactant materials to fabricate the metallic glassy systems (see Table 1). The powders were first balanced to give the average nominal composition of the starting desired composition, and mixed, using an agate mortar and pestle inside a glove box Workstation, mBRAUN, Germany) filled with helium gas. An amount of 150 g of powders was then charged into a Cr-steel vial (~1000 ml in volume) and sealed together with 100 balls (14 mm in diameter) made of Cr-steel alloy in the glove box. The ball-to-powder weight ratio was 36:1. The vial was mounted on a roller mill (RM20) provided by Zoz GmbH, Germany, operated at room temperature (RT) with a rotation speed of 235 rpm. The configuration and movement of the balls within the vial of the tumbling mill was in dynamic mode.

During ball milling of the metallic powders, useful kinetic energy that can be applied to the powder particles was governed by the following factors: (i) collision between the balls and the powders; (ii) pressure loading of powders pinned between milling media or between the milling media and the liner; (iii) impact of the falling milling media; and (iv) shear and abrasion caused by dragging of particles between moving milling media, and shock wave transmitted through crop load by falling milling media. The progress of the solid-state reaction was monitored by interrupting the MA process after pre-determined ball milling times (12.5 hours, 25 hours, 50 hours, 75 hours, and 100 hours), where the vial was opened in the glove box to take a represented sample. All samples were then characterized by different analytical techniques.

The coating process was started with a supersonic jet processed at a very high velocity (1200 m·s$^{-1}$). The powders were charged in a cold spray feeder and subjected to high pressure argon gas flow to pass through a pipeline connected to a supersonic jet and then sprayed onto the surface of the substrate. This process was repeated 3 times. All of the coated samples possessed excellent bonding, as displayed in Table 1 below.

TABLE 1

Metallic Glassy Powders Used for Coating

| Group | Composition |
|---|---|
| I | $Cu_{53.3}Zr_{25.5}Nb_{12.9}Ni_{8.3}$ |
| II | $CuZn_{54}Zr_{25}Nb_{14}Ni_7$ |
| III | $Cu_{48}Ti_{17}Ni_{28}Zr_5Ag_2$ |
| IV | $Cu_{85}/SUS_{316}L_{10}/Ag_5$ |

Example 2

Activity of Nanocoated Films Against Human Coronavirus Strain OC43

The nanocoated films were tested against the human coronavirus strain OC43. HEK 293 cells were used as host cells and Eagle Minimum Essential Medium (EMEM) supplemented with Bovine serum albumin (BSA) as the media. The cell culture was maintained at 37° C.±1° C. (5% $CO_2$ v/v) and scaled up to one 25 $cm^2$ flask. Once the confluent growth was acquired, the EMEM was poured off, the monolayer washed with 7.5 Dulbecco's Phosphate Buffered Saline (DPBS) and trypsinised with Trypsin EDTA. The culture flask was mixed vigorously to dislodge the monolayer. The cells, resuspended in EMEM (50-100 ml) in larger flasks of 175 cells, were inoculated with 100 µl of viral inoculum purchased from ATCC.

The culture was incubated at 37 $cm^2$. The cells were allowed to grow at a confluence of 60%-70%. Thereafter, incubation was achieved at 37° C.±1° C. (5% $CO_2$ v/v) until a cytopathic effect (CPE) was observed and the monolayer destroyed. Half of the resulting cell medium was withdrawn and combined with an equal volume of fresh medium and repeated for three (3) culture passages. After the third passage, an amount of 50 ml-100 ml of EMEM was taken and aliquoted into 10 equal portions in 50 ml centrifuge tubes and stored at −80° C. A single tube was removed the following day, and the viral titer was estimated in a 96 well plate. The mammalian cells were prepared as above and inoculated in a 96 well plate. A 12×0.5 log dilution of the viral culture was conducted across the plate and calculated using Spearman Karber. The titer was recorded for the following experiments.

A 20 mm circle of nanocoated PSW was fixed to the plate using a 20 mm adhesive disc. The wells were sterilized using UV lights and filled with 5 ml of DBPS. All the test cases were topped with an appropriate volume of calculated viral titer. The contents of tubes/cases were gently pipetted up and down three times with a 1000 µl pipettor to ensure complete dispersion of the inoculum. The OSRAM (L18W/840) lamp) was turned on. At timed intervals (1, 2, 3, 4, 6 and 24 hours), the contents of the tubes/cases were mixed by gentle pipetting. From each specimen, an amount of 20 µl was removed in quadruplet and added to appropriate 4 wells of the microtiter plate. Again, the contents were mixed six times by gentle pipetting and 7 serial, 0.5 log dilutions were made across the microtiter plate. This was repeated for each time point. The test plates were incubated at 37° C.±2° C. for up to 14 days. The plates were inspected after 2, 3, 5, 7 and 14 days of incubation by viewing each well using ×40, ×100 or ×200 magnification of an inverted light microscope. Each plate was examined for the presence of the monolayer and the appearance of CPE. The number of surviving viruses was calculated using the Spearmen Karber Computation using 0.5 log dilution factor employing the Spearman Karber formula. The TCID50 based on 200 µl was converted to TCID50/ml.

The agar disc diffusion assay (Salesa et al. 2019, Usman et al., 2016) was used to screen the antibacterial activity of the films in their as-prepared state against two food-borne pathogens, *Escherichia coli* (*E. coli*) and *Staphylococcus aureus* (*S. aureus*). *E. coli* and *S. aureus* were cultured in Tryptic Soy Broth (TSB) and incubated overnight at 37° C. A bacterial culture in TSB was sub-cultured three successive times to freshly prepared TSB prior to performing the test, and the overnight cultures were diluted in sterile buffer solution until the solution had an absorbance of 0.286±0.02 at 475 nm, which has a concentration of 1.5-3.0×108 CFU/mL. Each nanocomposite film sample (5 mm in diameter) was sterilized under UV radiation for 1 hour prior to testing. Care was taken to avoid contamination with microorganisms or to come into contact with each other. Film samples (5 mm in diameter) were placed on sterile petri dishes and covered with soft Mueller-Hinton agar (MHA) inoculated with 100 µL of each type of indicator bacteria at a final concentration of 1.5-3.0×105 CFU/mL. Next, the plates were incubated at 37° C. for 24 h and the diameters of the inhibition zones obtained from three parallel measurements were determined. The inhibitory zone diameters for each nanocomposite film sample against Gram-negative bacteria (*E. coli*) and Gram-positive bacteria (*S. aureus*) were determined using the disc diffusion method.

The control films did not provide any antibacterial activity. PSW films coated with Group B provided the largest inhibitory zone diameters for *S. aureus* (10±0.1 mm). PSW/LLDPE and TPS coated with group B have the same inhibition diameter (9±0.4 mm) (9±0.2 mm), respectively. When compared to *S. aureus*, the nanocomposite films demonstrated a relatively low killing efficacy against *E. coli*.

The ATP analysis was done using the QuenchGone™ Aqueous (QGA) Kit from Lumin Ultra (Canada) as per the manufacturer's instruction. A total of 50 ml of sample was passed through a cellulose acetate filter unit (0.45 µM) using a 60-ml syringe provided in the kit. Thereafter, 1 mL of lysis solution (UltraLyse7) was allowed to pass through the filter unit. The lysate was collected in a 9 ml UltraLute (Dilution) solution. The contents of the tube were mixed thoroughly and 100 µl of the solution was added to a new 12×55-mm test tube. The enzyme Luminase (100 µl) was added to the test tube and the solution was swirled and placed in the Lumin Ultra PhotonMaster, Luminometer (Lumin Ultra, Canada) immediately to record the luminescence. The instrument was calibrated using the calibration solution (UltraCheck) provided with the kit. Calibration was performed prior to every analysis and repeated after every two hours. The readings were obtained as relative luminance units (RLU).

The standard procedure of RNA isolation from Trizol was followed to extract total RNA. Briefly, 1-5 ml of lysate was withdrawn from each bottle and 0.2 volume of chloroform was added per ml of lysate. After centrifugation at 4° C. for 10 minutes at 15000 g, the upper aqueous layer was separated and added to 0.5 ml volume (per ml of lysate) of isopropanol. The mixture was incubated in ice for 10 minutes and centrifuged (4° C. for 10 mins at 15,000 g) to pellet the RNA. Thereafter, the pellet was washed with 75% ethanol and eluted in Tris-EDTA. The more advanced fluorometric method was also used for RNA quantification (Habibi et al. 2021a) as the downstream application of qPCR was based on a highly precise estimation of nucleic acids. The high sensitivity Qubit HS ssRNA kit was used for this purpose and all measurements were done on the Qubit 4 fluorometer (Thermo Scientific, Paisley, UK). Total bacterial counts were estimated through the quantitative polymerase chain reaction (qPCR). Prior to this, the RNA was treated with DNAse and then converted to complementary DNA (cDNA) using Iscript™ reverse transcriptase supermix (Bio Rad, CA). The cDNA (2 µl) was added to 2×SSO Advanced SYBR® Green supermix (BioRad, Canada) along with universal bacterial primers (300 nM Forward and Reverse). The total reaction volume was made up to 20 µl with nuclease free water and the qPCR was performed on the CFX96™ Deep Well thermal cycler (BioRad, Canada). Standard *E. coli* DNA (2.4 e±06 cells/ml) was used as positive control (Habibi et al. 2021b). Serial dilutions of positive control were also amplified along with the samples. The cycle threshold (Ct) values of standard DNA were plotted to obtain a standard curve, which was used for quantification of targets. The cycling conditions were set for Initial Denaturation at 95° C. (3 minutes); followed by 40 rounds of Denaturation at 95° C. (20 seconds); Annealing and Extension 60° C. (45 sec) (Li et al. 2017). The melt curve analysis was carried out at 60° C. The results are summarized in Tables 2-9 below.

TABLE 2

Viral Titre Reading of Control Sample

| Test Solution | Time (h) | 1 | 2 | 3 | Mean Count/ml | Mean Log Count | Mean Log kill | SEM* |
|---|---|---|---|---|---|---|---|---|
| Light Control | 0 | 88914 | 28117 | 50000 | 55677 | 4.75 | 0.00 | 0.00 |
| | 6 | 37495 | 37495 | 28117 | 34369 | 4.54 | −0.17 | 0.15 |
| | 24 | 5000 | 2812 | 3749 | 3854 | 3.59 | −1.13 | 0.07 |
| Dark Control | 0 | 88914 | 28117 | 50000 | 55677 | 4.75 | 0.00 | 0.00 |
| | 6 | 88914 | 15811 | 11857 | 38861 | 4.59 | −0.29 | 0.18 |
| | 24 | 6668 | 3749 | 6668 | 5695 | 3.76 | −0.96 | 0.08 |

TABLE 3

Viral Cell Counts of Human Corona Virus OC43 Against Control Surfaces.

| Test Solution | Time (h) | Count/ml | Log Count | Log kill |
|---|---|---|---|---|
| LLDPE | 0 | 55677 | 4.75 | 0.00 |
| | 1 | 8891 | 3.95 | −0.80 |
| | 2 | 15811 | 4.20 | −0.55 |
| | 4 | 15811 | 4.20 | −0.55 |
| | 6 | 8891 | 3.95 | −0.80 |
| | 24 | 119 | 2.08 | −2.67 |
| PSW | 0 | 55677 | 4.75 | 0.00 |
| | 1 | 11857 | 4.07 | −0.67 |
| | 2 | 28117 | 4.45 | −0.30 |
| | 4 | 6668 | 3.82 | −0.92 |
| | 6 | 11857 | 4.07 | −0.67 |
| | 24 | 1186 | 3.07 | −1.67 |
| LLDPE/PSW | 0 | 55677 | 4.75 | 0.00 |
| | 1 | 37495 | 4.57 | −0.17 |
| | 2 | 37495 | 4.57 | −0.17 |
| | 4 | 28117 | 4.45 | −0.30 |
| | 6 | 8891 | 3.95 | −0.80 |
| | 24 | 667 | 2.82 | −1.92 |

TABLE 3-continued

Viral Cell Counts of Human Corona Virus OC43 Against Control Surfaces.

| Test Solution | Time (h) | Count/ml | Log Count | Log kill |
|---|---|---|---|---|
| Biodegradable substrate | 0 | 55677 | 4.75 | 0.00 |
| | 1 | 11857 | 4.07 | −0.67 |
| | 2 | 28117 | 4.45 | −0.30 |
| | 4 | 28117 | 4.45 | −0.30 |
| | 6 | 2812 | 3.45 | −1.30 |
| | 24 | 2108 | 3.32 | −1.42 |

TABLE 4

Viral Cell Counts of Human Corona Virus OC43 Against Group A Surfaces.

| Test Solution | Time (h) | Count/ml | Log Count | Log kill |
|---|---|---|---|---|
| LLDPE | 0 | 55677 | 4.75 | 0.00 |
| | 1 | 119 | 2.08 | −2.67 |
| | 2 | 211 | 2.32 | −2.42 |
| | 4 | 281 | 2.45 | −2.30 |
| | 6 | 158 | 2.20 | −2.55 |
| | 24 | 89 | 1.95 | −2.80 |
| PSW | 0 | 55677 | 4.75 | 0.00 |
| | 1 | 89 | 1.95 | −2.80 |
| | 2 | 158 | 2.20 | −2.55 |
| | 4 | 158 | 2.20 | −2.55 |
| | 6 | 89 | 1.95 | −2.80 |
| | 24 | 158 | 2.20 | −2.55 |
| LLDPE/PSW | 0 | 55677 | 4.75 | 0.00 |
| | 1 | 281 | 2.45 | −2.30 |
| | 2 | 281 | 2.45 | −2.30 |
| | 4 | 119 | 2.08 | −2.67 |
| | 6 | 89 | 1.95 | −2.80 |
| | 24 | 37 | 1.57 | −3.18 |
| Biodegradable substrate | 0 | 55677 | 4.75 | 0.00 |
| | 1 | 211 | 2.32 | −2.42 |
| | 2 | 158 | 2.20 | −2.55 |
| | 4 | 89 | 1.95 | −2.80 |
| | 6 | 89 | 1.95 | −2.80 |
| | 24 | 1 | 0.00 | −4.75 |

TABLE 5

Viral Cell Counts of Human Corona Virus OC43 Against Group B Surfaces.

| Test Solution | Time (h) | Count/ml | Log Count | Log kill |
|---|---|---|---|---|
| LLDPE | 0 | 55677 | 4.75 | 0.00 |
| | 1 | 2812 | 3.45 | −1.30 |
| | 2 | 119 | 2.08 | −2.67 |
| | 4 | 89 | 1.95 | −2.80 |
| | 6 | 50 | 1.70 | −3.05 |
| | 24 | 1 | 0.00 | −4.75 |
| PSW | 0 | 55677 | 4.75 | 0.00 |
| | 1 | 889 | 2.95 | −1.80 |
| | 2 | 89 | 1.95 | −2.80 |
| | 4 | 89 | 1.95 | −2.80 |
| | 6 | 37 | 1.57 | −3.18 |
| | 24 | 1 | 0.00 | −4.75 |
| LLDPE/PSW | 0 | 55677 | 4.75 | 0.00 |
| | 1 | 667 | 2.82 | −1.92 |
| | 2 | 37 | 1.57 | −3.18 |
| | 4 | 37 | 1.57 | −3.18 |
| | 6 | 50 | 1.70 | −3.05 |
| | 24 | 1 | 0.00 | −4.75 |
| Biodegradable substrate | 0 | 55677 | 4.75 | 0.00 |
| | 1 | 3749 | 3.57 | −1.17 |
| | 2 | 119 | 2.08 | −2.67 |

TABLE 5-continued

Viral Cell Counts of Human Corona Virus OC43
Against Group B Surfaces.

| Test Solution | Time (h) | Count/ml | Log Count | Log kill |
|---|---|---|---|---|
| 4 | 1 | 0.00 | −4.75 | |
| 6 | 1 | 0.00 | −4.75 | |
| 24 | 1 | 0.00 | −4.75 | |

TABLE 6

Viral Cell Counts of Human Corona Virus OC43
Against Group C Surfaces.

| Test Solution | Time (h) | Count/ml | Log Count | Log kill |
|---|---|---|---|---|
| LLDPE | 0 | 55677 | 4.75 | 0.00 |
| | 1 | 281 | 2.45 | −2.30 |
| | 2 | 281 | 2.45 | −2.30 |
| | 4 | 89 | 1.95 | −2.80 |
| | 6 | 89 | 1.95 | −2.80 |
| | 24 | 89 | 1.95 | −2.80 |
| PSW | 0 | 55677 | 4.75 | 0.00 |
| | 1 | 211 | 2.32 | −2.42 |
| | 2 | 119 | 2.08 | −2.67 |
| | 4 | 89 | 1.95 | −2.80 |
| | 6 | 89 | 1.95 | −2.80 |
| | 24 | 89 | 1.95 | −2.80 |
| LLDPE/PSW | 0 | 55677 | 4.75 | 0.00 |
| | 1 | 158 | 2.20 | −2.55 |
| | 2 | 89 | 1.95 | −2.80 |
| | 4 | 158 | 2.20 | −2.55 |
| | 6 | 89 | 1.95 | −2.80 |
| | 24 | 89 | 1.95 | −2.80 |
| Biodegradable substrate | 0 | 55677 | 4.75 | 0.00 |
| | 1 | 89 | 1.95 | −2.80 |
| | 2 | 89 | 1.95 | −2.80 |
| | 4 | 119 | 2.08 | −2.67 |
| | 6 | 89 | 1.95 | −2.80 |
| | 24 | 37 | 1.57 | −3.18 |

TABLE 7

Viral Cell Counts of Human Corona Virus OC43
Against Group D Surfaces.

| Test Solution | Time (h) | Count/ml | Log Count | Log kill |
|---|---|---|---|---|
| LLDPE | 0 | 55677 | 4.75 | 0.00 |
| | 1 | 281 | 2.45 | −2.30 |
| | 2 | 281 | 2.45 | −2.30 |
| | 4 | 281 | 2.45 | −2.30 |
| | 6 | 89 | 1.95 | −2.80 |
| | 24 | 281 | 2.45 | −2.30 |
| PSW | 0 | 55677 | 4.75 | 0.00 |
| | 1 | 119 | 2.08 | −2.67 |
| | 2 | 281 | 2.45 | −2.30 |
| | 4 | 211 | 2.32 | −2.42 |
| | 6 | 281 | 2.45 | −2.30 |
| | 24 | 281 | 2.45 | −2.30 |
| LLDPE/PSW | 0 | 55677 | 4.75 | 0.00 |
| | 1 | 281 | 2.45 | −2.30 |
| | 2 | 158 | 2.20 | −2.55 |
| | 4 | 281 | 2.45 | −2.30 |
| | 6 | 281 | 2.45 | −2.30 |
| | 24 | 281 | 2.45 | −2.30 |
| Biodegradable substrate | 0 | 55677 | 4.75 | 0.00 |
| | 1 | 158 | 2.20 | −2.55 |
| | 2 | 158 | 2.20 | −2.55 |
| | 4 | 211 | 2.32 | −2.42 |
| | 6 | 281 | 2.45 | −2.30 |
| | 24 | 281 | 2.45 | −2.30 |

TABLE 8

Results of the antibacterial screening tests
through agar diffusion assay
Results of the antibacterial screening tests through
agar diffusion assay Inhibitory Diameter (mm)

| Sample | S. aureus | E. coli |
|---|---|---|
| GB PSW | 10 ± 0.1 | — |
| GB LLDPE/PSW | 9 ± 0.4 | — |
| GD Biodegradable Substrate | 9 ± 0.2 | — |
| GC LLDPE/PSW | — | 8 ± 0.4 |

TABLE 9

Reduction in cell counts employing the enumeration method

Log10 CFU/ml for Surrounding Culture

| Sample | 0 hrs | | 6 hrs. | | 24 hrs. | | Microorganism |
|---|---|---|---|---|---|---|---|
| GB PSW | 7.87 | 7.87 | 8.62 | 6.48 | 9.77 | 9.20 | S. aureus |
| GB LLDPE/PSW | 7.87 | 7.87 | 7.32 | 6.20 | 9.59 | 8.84 | |
| GD Biodegradable Substrate | 7.87 | 7.87 | 7.60 | 6.54 | 9.71 | 9.04 | |
| GC LLDPE/PSW | 8.09 | 8.09 | 8.61 | 7.81 | 4.88 | 4.51 | E. Coli |

Log10 CFU/cm2 for Film Surface

| Sample | 6 hrs. | | 24 hrs. | | Microorganism |
|---|---|---|---|---|---|
| GB PSW | 7.87 | 7.87 | 6.48 | 5.47 | 5.48 | 4.88 | S. aureus |
| GB LLDPE/PSW | 7.87 | 7.87 | 5.22 | 5.56 | 5.22 | 5.57 | |
| GD Biodegradable Substrate | 7.87 | 7.87 | 5.78 | 5.32 | 5.37 | 4.29 | |
| GC LLDPE/PSW | 8.09 | 8.09 | 6.17 | 4.88 | 6.98 | 4.51 | E. Coli |

It is to be understood that the polymeric anti-microbial film is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A polymeric anti-microbial film, comprising:
a polymeric film including at least one polymeric material selected from the group consisting of a linear low-density polyethylene (LLDPE), a plastic solid waste (PSW), a bio-based plastic, and a combination thereof; and
a metallic coating on the at least one polymeric material, the metallic coating comprising a metallic alloy powder selected from the group consisting of $Cu_{53.3}Zr_{25.5}Nb_{12.9}Ni_{8.3}$, $CuZn_{54}Zr_{25}Nb_{14}Ni_7$, $Cu_{48}Ti_{17}Ni_{28}Zr_5Ag_2$, $Cu_{85}/SUS316L_{10}/Ag_5$, and a combination thereof.

2. The polymeric anti-microbial film of claim 1, wherein the at least one polymeric material comprises a blend of linear low-density polyethylene (LLDPE) and a plastic solid waste (PSW).

3. The polymeric anti-microbial film of claim 1, wherein the bio-based plastic is selected from the group consisting of modified polyester-polybutylene adipate terephthalate, polybutylene adipate co-terephthalate, polylactide, and a combination thereof.

4. The polymeric anti-microbial film of claim 1, wherein the bio-based plastic has a melting temperature ($T_m$) ranging from about 110° C. to about 150° C.

5. The polymeric anti-microbial film of 4, wherein the bio-based plastic has a melting temperature ($T_m$) of about 120° C.

6. A method of protecting a surface from microbial or viral growth, comprising contacting the surface with the polymeric anti-microbial film of claim 1.

7. The method of claim 6, wherein the microbial or viral growth comprises viral growth.

8. The method of claim 7, wherein the viral growth comprises growth of human coronavirus strain OC43.

9. The method of claim 6, wherein the microbial growth comprises bacterial growth.

10. The method of claim 9, wherein the bacterial growth comprises growth of Gram-negative bacteria.

11. The method of claim 10, wherein the Gram-negative bacteria comprises *Escherichia coli* (*E. coli*).

12. The method of claim 9, wherein the bacterial growth comprises growth of Gram-positive bacteria.

13. The method of claim 12, wherein the Gram-positive bacteria comprises *Staphylococcus aureus* (*S. aureus*).

14. A method of protecting a surface from microbial growth comprising contacting the surface with an anti-microbial film, the anti-microbial film comprising:

a polymeric film comprising at least one polymeric material selected from the group consisting of a linear low-density polyethylene (LLDPE), a plastic solid waste (PSW), a bio-based plastic, and a combination thereof; and a metallic coating on the at least one polymeric material, the metallic coating comprising a metallic alloy powder selected from the group consisting of $Cu_{53.3}Zr_{25.5}Nb_{12.9}Ni_{8.3}$, $CuZn_{54}Zr_{25}Nb_{14}Ni_7$, $Cu_{48}Ti_{17}Ni_{28}Zr_5Ag_2$, $Cu_{85}/SUS316L_{10}/Ag_5$, and a combination thereof.

15. The method of claim 14, wherein the at least one polymeric material comprises a blend of linear low-density polyethylene (LLDPE) and a plastic solid waste (PSW).

16. The method of claim 14, wherein the bio-based plastic is selected from the group consisting of modified polyester-polybutylene adipate terephthalate, polybutylene adipate co-terephthalate, polylactide, and a combination thereof.

17. The method of claim 14, wherein the bio-based plastic has a melting temperature ($T_m$) ranging from about 110° C. to about 150° C.

18. The method of 17, wherein the bio-based plastic has a melting temperature ($T_m$) of about 120° C.

* * * * *